United States Patent [19]
Morena

[11] Patent Number: 5,804,769
[45] Date of Patent: Sep. 8, 1998

[54] TELEPHONE LINE PROTECTION DEVICE

[76] Inventor: Carmen G. Morena, 48 Columbus Ave., Providence, R.I. 02908

[21] Appl. No.: 705,492

[22] Filed: Aug. 29, 1996

Related U.S. Application Data

[60] Provisional application No. 60/003,636 Sep. 12, 1995.
[51] Int. Cl.⁶ ...................................................... H01B 7/24
[52] U.S. Cl. .......................... 174/136; 340/540; 340/541; 340/566; 340/571; 174/683; 174/101; 379/437; 379/438; 379/434; 361/643
[58] Field of Search ..................................... 340/540, 541, 340/566, 563, 571, 693; 174/683, 136, 77 R; 379/437, 438, 634; 200/308, 333; 52/220.1, 732.2; 361/643

[56] References Cited

U.S. PATENT DOCUMENTS

| | | | |
|---|---|---|---|
| 277,765 | 5/1883 | McKenney | 238/127 |
| 2,239,652 | 4/1941 | Morten et al. | 439/216 |
| 3,996,415 | 12/1976 | Provorse | 174/48 |
| 5,041,697 | 8/1991 | Halper et al. | 174/65 R |
| 5,306,178 | 4/1994 | Huang | 439/536 |
| 5,315,654 | 5/1994 | Kraft | 379/438 |
| 5,357,053 | 10/1994 | Manaras | 174/48 |
| 5,369,548 | 11/1994 | Combs | 361/643 |
| 5,519,756 | 5/1996 | Clift | 379/44 |
| 5,682,926 | 11/1997 | Perttula | 138/157 |

Primary Examiner—Jeffery A. Hofsass
Assistant Examiner—Benjamin C. Lee
Attorney, Agent, or Firm—Robert J. Doherty

[57] ABSTRACT

A wire protection device especially for telephone lines mounted on an outside building wall including a pair of channel-shaped members adapted to entrap and protectively enclosure at least the lower wire portion of the line which is normally accessible to being cut.

1 Claim, 4 Drawing Sheets

5,804,769

TELEPHONE LINE PROTECTION DEVICE

This application claims the benefit of Provisional application Ser. No. 60/003,636 filed Sept. 12, 1995.

BACKGROUND AND OBJECTS OF THE INVENTION

This invention relates to the protection of wires leading to houses, businesses and the like from being purposely cut or otherwise tampered with. More particularly, the invention deals with a protection system or shield which prevents burglars and others from disabling the telephone of a home or business when such telephone lines are attached to the outer surface of the structure such as a house or place of business.

It is common to provide telephone service to a structure such as a house by stringing the telephone line from the utility pole to a point relatively high on the structure wall and thence directing the telephone line downward along the outside of the structure wall to a point where it enters into the building through the outside wall thereof to the basement or other floor on which the telephone line is distributed to various telephone outlet jacks within the building. Obviously when such telephone lines are unshielded or otherwise unprotected, it is a simple matter for a burglar armed with a cutting tool such as shears or the like to disable the phone system by cutting the outside telephone line immediately prior to a burglary attempt or in other instances cutting the line well prior to such intended event. In either case, the ease in which such telephone lines can be disabled makes it easier for such crimes to be committed.

Several attempts have been made to generally provide tamper-resistant guards for electrical wires such as those shown in the following U.S. patents: U.S. Pat. No. 3,654,379 issued Apr. 4, 1972, U.S. Pat. No. 3,740,455 issued Jun. 19, 1973; U.S. Pat. No. 4,640,314 issued Feb. 3, 1987; and U.S. Pat. No. 5,235,136 issued Aug. 10, 1993. Despite the existence of such suggested proposals, the need still exist for a safe, secure and low cost solution to this ever increasing problem.

Accordingly, the primary object of the present invention is to provide a device which makes it far more difficult or even impossible for an intended criminal to disable telephone lines mounted on the outside of structures such as houses, businesses and the like.

A further object of the present invention is the provision of such a protective device which is constructed in a relatively straightforward and low cost manner and which can be simply and easily installed without the need to disconnect, cut and re-splice or otherwise tamper with the existing telephone line connection through the building wall.

A still further object of the present invention is to provide a device which enables the above features to be accomplished yet which is further weatherproof and which can be appropriately provided with a safety alarm should the main device be tampered with in an attempt to cut the telephone lines.

These and other objects of the present invention are accomplished by a two-part sleeve structure formed of a sturdy cut resistant material such as aluminum in which a base sleeve placed directly on the outside surface of the structure wall which receives the telephone line and further includes a top sleeve which when fitted over the base sleeve and in turn attached thereto and to the supporting structure wall provides a cut proof barrier in which the telephone line is safely secured.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
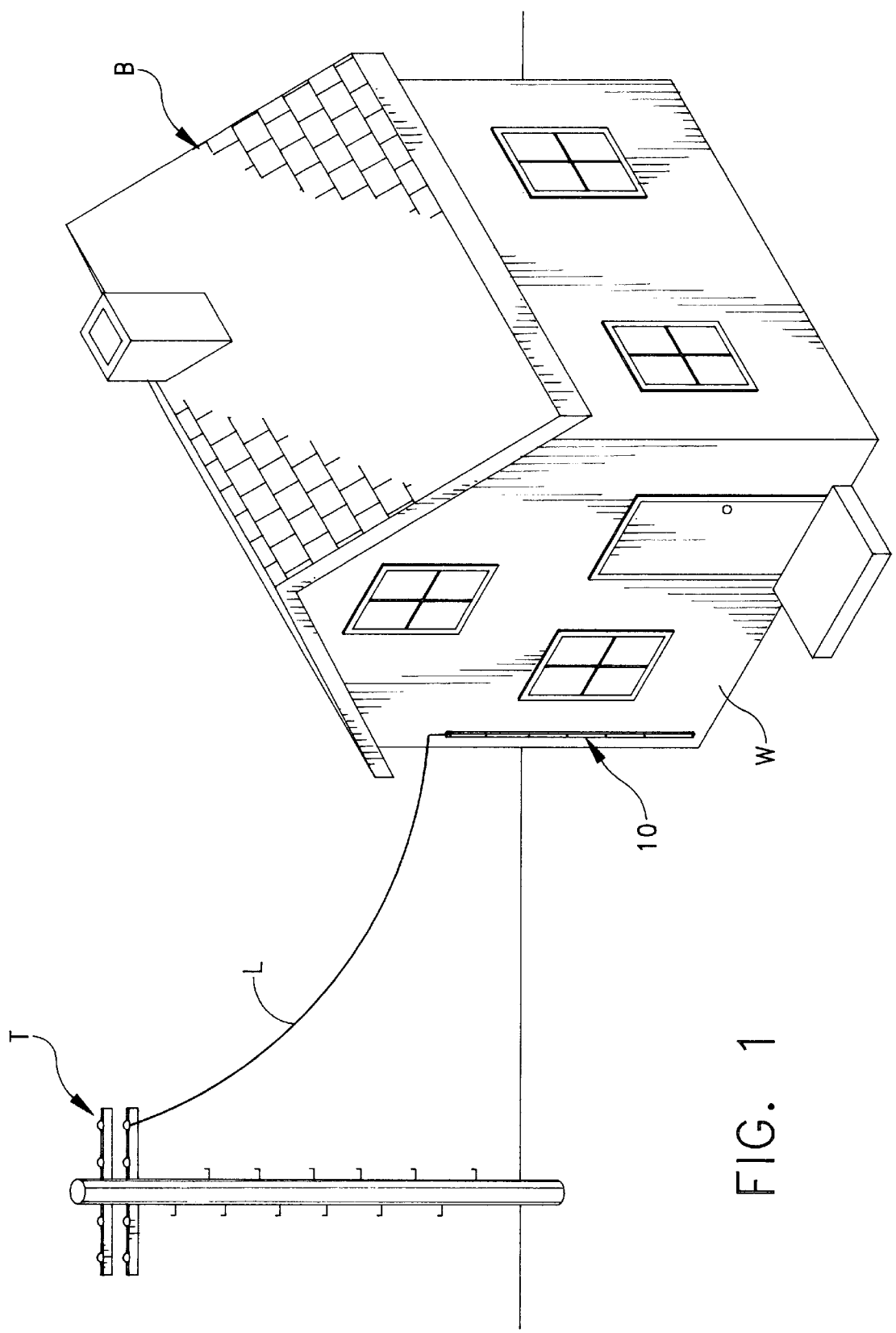
FIG. 1 is a perspective view showing the overall manner in which the invention may be practiced.
Figure 2:
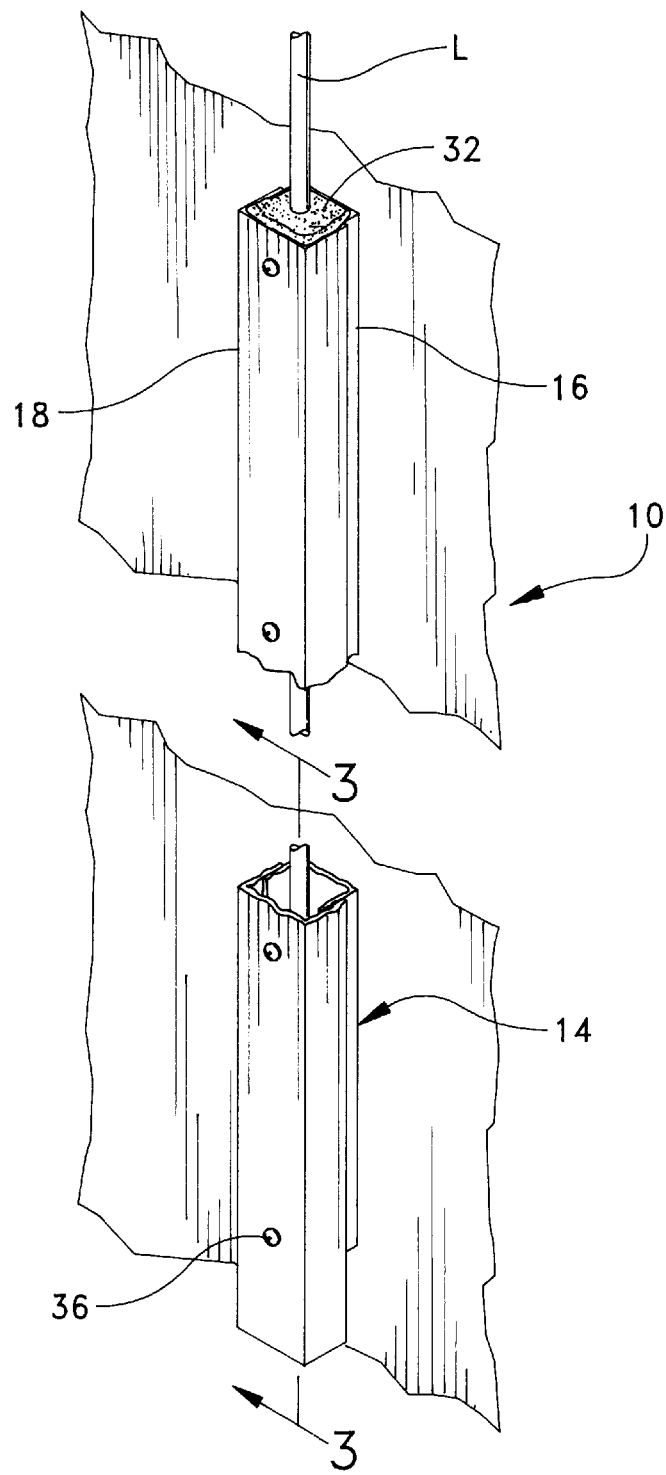
FIG. 2 is a enlarged perspective view with parts broken away for clarity showing the device of the present invention mounted upon the outside wall of a structure.

Turning now to the drawings and particularly FIG. 1 thereof, a house or other building B is depicted including and outer wall W to which the telephone line L is attached. Normally, the line L extends from a telephone or other utility pole T to an upper point on the wall W and thence downwardly to a lower point in which the telephone line enters the interior of the structure B through an appropriate opening 12 and thence is appropriately jacked throughout the house, apartment or other structure to the individual telephone or telephones therein. Such line L although shielded by an appropriate weatherproof coating, coatings or layers is easily cut and therefore mounting on the outside of the wall W makes it inherently prone to vandalism and an invitation to crime.

The device 10 of the present invention provides the necessary deterrent and as best shown in the remaining drawings of the application comprises an enclosure 14 in which the telephone line L is adapted to extend into at some appropriate upper point on the wall W most often determined by the height at which a would-be burglar could reach with a pair of shears or other cutting instrument without the assistance of a ladder or the like. The telephone line L enters the enclosure 14 at such upper point and thereafter is housed in the enclosure 14 as will be hereinafter more fully brought out.

The enclosure 14 includes a base or lower channel 16 which is positioned directly against the wall W and an overlying or outer channel 18 adapted to extend over the base channel 16 and thus completely shield the telephone line L housed therein. The base channel 16 as well as the outer channel 18 are preferably formed from an extremely difficult, if not impossible, to cut, tear or otherwise destroy material, such as metal of a non-corrodible type such as aluminum or otherwise protected from the weather since the enclosure is open to the elements but does not preclude other engineering materials such as suitably reinforced resinous plastics, graphite and the like. Both the channels 16, 18 are preferably U-shaped and of cross-sectional configuration with the lateral extent of the outer channel 18 being slightly greater than that of the base channel 16 so that it provides a close fitting relationship between the component parts which discourages attempts to pry between and additionally results in a weatherproof enclosure 14.

The base channel 16 thus includes a bottom wall 20 and a pair of upstanding side walls 22 while the outer channel 18 includes an outer or upper wall 24 and downwardly extending side walls 26, it being clear that the interior surfaces 28 of the side walls 26 are disposed in face-to-face and preferably touching relationship with the outer surfaces 25 of the side walls 22. This not only provides an essentially waterproof and otherwise protective enclosure for the telephone line L but further presents a unitary outer appearance to the enclosure 14 and overall device 10 so as to discourage attempts to pry the two pieces apart from each other.

In addition, the lower end of the outer channel 18 is provided with an end wall or end cap 30 for the same general purpose and so that objects cannot be inserted into the interior of the enclosure 14 in an attempt to destroy the telephone line L.

The upper ends of the channels 16 and 18 preferably terminate at the same proximate point but it should be brought out that the base channel may extend further upward, but in any event, it is also preferable to utilize a fluid mastic or putty-like material where the two top ends come together so as to, in effect, encapsulate the otherwise open end so that a waterproof upper end is presented to the elements. Such top end plug 32 either sets up or otherwise hardens dependent upon the material utilized. Suitable materials for such purpose are putty and various plastic based caulks that are widely available. The lower end 19 of the base channel 18 terminates above the lower end of the outer channel 16 such that a space 21 is present and available such that the telephone line passes through the house wall at such space as will be hereinafter referred to and so that the telephone line does not have to be altered in any way to accommodate the protection device of the present invention.

In addition, the bottom wall 20 and the top wall 24 of the base and outer channels 16, 18 respectively are provided with suitably vertically aligned openings 34 and 35 respectively such that screws 36 may be passed through such openings and thence into the wall W so as to secure the enclosure 14 to the wall. Tubular spacers 38 are provided such that the screws 36 pass therethrough and serve to provide the proper telescoping extent of the outer element 18 vis-a-vis the base channel 16 when desired, to add additional rigidity to the structure and also to prevent the telephone line L from coming in contact with the threads of the screws 36 and thus avoid fraying, cutting and the like due to such action. Also, it is preferable to form such spacers 38 from a non-conductive material such that if inadvertent fraying or cutting or contact between the electrically conductive cores of the telephone line are in the unlikely event exposed, they will not short against a metal to metal contact.

Thus when it is desired to assemble the enclosure 14, the base channel 16 is placed up against the wall W behind the telephone line L (the channel 16 is, in effect, slipped behind the telephone line L) with its lower end 19 placed above the telephone line where it passes into the structure's interior via a secondary hole 42. The above arrangement assures that the space 21 between the lower ends of the channels is positioned such that the secondary hole through which the telephone line passes through the wall 42 is in turn positioned in this space and this insures that the telephone line need not be cut and re-spliced or in any other way tampered with to accept the channels 16, 18. Then the upper and lower holes 34 and 35 aligned, the screws 36 pass through the upper holes 34, the spacers 38 threaded thereover and then the screws inserted through the lower holes 35 and thence into the wall W. It should also be brought out that it is preferable that sheet metal clips or nuts 44 be placed between the wall and the outside surface of the bottom wall 20 such that when the screws 36 are screwed into the wall, the sheet metal locking nuts 44 make it extremely hard the unscrew the screws 36. It addition, the driving heads of the screws may be provided with non standard slots requiring special screwdrivers to further enhance the security of the above described composite enclosure. Examples of non-standard screw heads include star, clutch and S types. If desired, the enclosure 14 when formed of electrically conductive material can be grounded through the provision of a ground wire 46 attached to the end cap 30 via an opening 48 provided therein for the receipt of a screw 50. In addition, the end cap 30 may include a drain or weep hole 51 such that any built-up moisture in the enclosure 14 as through condensation or leakage has a chance to pass outwardly therefrom.

It may be thus apparent that the overall objects of the invention are accomplished by the above-described device and that when extending high enough up on the wall W of the building B, it is extremely unlikely that all but professional thieves will be deterred from cutting the telephone line L as a precursor to robbing or otherwise entering the building B.

Figure 3:
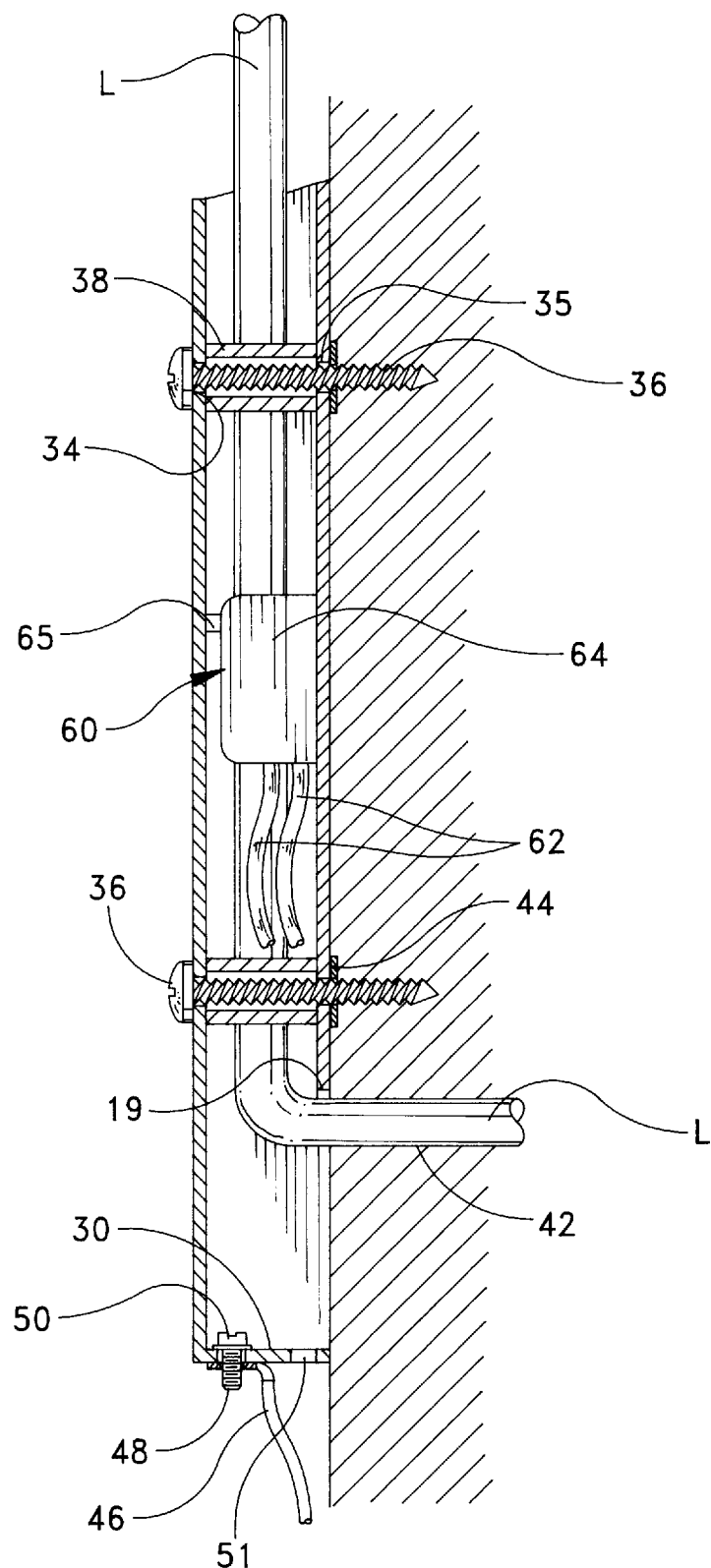
FIG. 3 is a side sectional view taken along the line 3—3 of FIG. 2.
Figure 4:
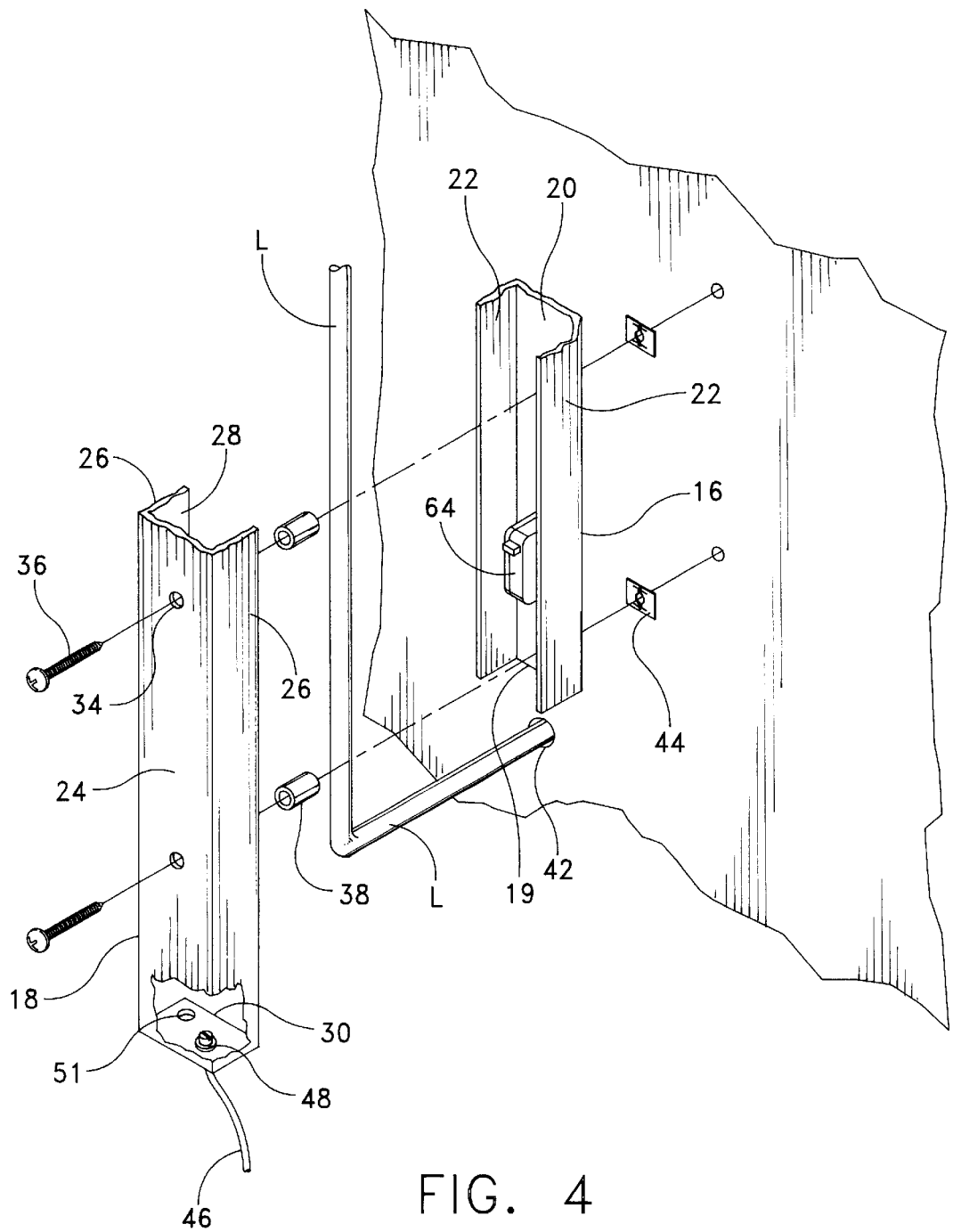
FIG. 4 is an exploded view of a portion of the device showing the manner in which component portions thereof interrelate and are fastened to the structure wall.

As a further security element, the enclosure 14 may house an alarm 60. Such alarm 60 includes a pair of wires 62 attached at opposite ends to an alarm device and to a switch 64. The audible or visible portion of the alarm device may be housed inside the building B as by suitably passing the wires 62 through the same opening through which the telephone line L passes or a second opening for such purpose. The alarm device may be of any suitable type, that is, audible, visual or connected to a transmission device separate from the telephone line, or operative when the telephone line L is tampered with. Such electrical switch 64 is preferably of the type that includes a manually depressible or otherwise depressible button 65 which when downwardly engaged deactivates the current passing through the wires 62 and when released serves to activate the circuit represented by the wires 62 and thus signal the separate signaling device housed within the building B. Such button 65 is positioned such that the under surface of the top wall 26 depresses such when the enclosure 14 is in the assembled position such as shown in FIG. 3 and thus if the outer channel 18 is somehow removed from the base channel, the switch 64 would become activated. The switch 64 may be appropriately connected to the base channel 16 as by threaded attachment by a screw passing through the side walls 22, by gluing or any other suitable means.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described but rather as set forth in the following claims.

What is claimed is:

1. A tamper resistant guard device for wires adapted to extend across the outer wall surface of a building from a first point along a path of finite distance prior to extending through the outer wall surface into interior portions of the building via an opening provided in such outer wall at a second point on such outer wall removed from said first point comprising, a two-part sleeve structure including a first elongated base member having a lower wall adapted for placement directly against the building outer wall surface and beneath said wire along at least a significant portion of said finite distance to a point adjacent to but slightly short of said building outer wall opening at said second point, an elongated second member adapted to overlie said base member, said second member having an upper wall and downwardly extending side walls and with the second member said upper wall adapted for face-to-face positioning over said base lower wall and above said wire so as to form an enclosure for said wire between said members along said portion of said finite distance, said second member extending beyond both the first member at said second point and said building outer wall opening and fastening means passing through both said first and second member lower and upper walls respectively and into said building outer wall so as to both connect said members together and fasten said device to said building, wherein both said first and second members being of U-shaped cross section with said first member having a pair of side walls upstanding from said bottom wall, the lateral width of said second member being slightly greater than that of said first member such that the second member is positioned in telescoped relationship above said first member with the respective side walls of each member contacting each other, said second member including a bottom wall connecting said upper and side walls at the end thereof proximal to said building wall opening, the opposite end of both said second member and said first member being normally open for receipt of said wire, said normally open end of said members being plugged with a waterproof material to prevent rain water from entering said wire enclosure, said bottom wall of said second member further including a drain opening.

* * * * *